United States Patent
Shin et al.

(10) Patent No.: US 11,161,395 B2
(45) Date of Patent: Nov. 2, 2021

(54) ELECTRIFICATION APPARATUS FOR ELECTRIC DUST COLLECTION AND AIR CONDITIONER FOR VEHICLE INCLUDING SAME

(71) Applicant: LG Electronics Inc., Seoul (KR)

(72) Inventors: Namgyu Shin, Seoul (KR); Naehyun Park, Seoul (KR); Hyunmin Shim, Seoul (KR); Keonwang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 512 days.

(21) Appl. No.: 16/049,444

(22) Filed: Jul. 30, 2018

(65) Prior Publication Data

US 2020/0023716 A1   Jan. 23, 2020

(30) Foreign Application Priority Data

Jul. 20, 2018 (KR) .......................... 10-2018-0084894

(51) Int. Cl.
| | |
|---|---|
| *B60H 3/00* | (2006.01) |
| *B03C 3/09* | (2006.01) |
| *B03C 3/38* | (2006.01) |
| *B03C 3/47* | (2006.01) |
| *B03C 3/41* | (2006.01) |
| *B03C 3/60* | (2006.01) |

(52) U.S. Cl.
CPC ............ *B60H 3/0078* (2013.01); *B03C 3/09* (2013.01); *B03C 3/38* (2013.01); *B03C 3/41* (2013.01); *B03C 3/47* (2013.01); *B03C 3/60* (2013.01); *B03C 2201/30* (2013.01)

(58) Field of Classification Search
CPC combination set(s) only.
See application file for complete search history.

(56) References Cited

U.S. PATENT DOCUMENTS

| 1,344,330 | A | * | 6/1920 | Bradley | .................... B03C 3/86 |
| | | | | | 96/64 |
| 2,252,694 | A | * | 8/1941 | Bennett | .................. H01T 19/04 |
| | | | | | 315/58 |
| 2,579,445 | A | * | 12/1951 | Rayw | ...................... B03C 3/155 |
| | | | | | 96/66 |
| 3,073,094 | A | * | 1/1963 | Landgraf | .................. B03C 3/14 |
| | | | | | 96/66 |

(Continued)

FOREIGN PATENT DOCUMENTS

KR   10-2016-0015640   2/2016

*Primary Examiner* — Christopher P Jones
*Assistant Examiner* — Sonji Turner
(74) *Attorney, Agent, or Firm* — Fish & Richardson P.C.

(57) ABSTRACT

The present invention relates to an electrification apparatus for electric dust collection and an air conditioner for a vehicle including the same. According to the teachings of the present invention, there is provided an electrification apparatus for electric dust collection including: a frame which forms an outer appearance; conductive microfibers which are installed in the frame and generates ions in the air; and conductive plates which are installed in the frame and generate a potential difference with the conductive microfibers. The conductive plates are disposed so as to surround the conductive microfibers to form an electrification space in which an electric field is generated. At this time, the electrification space is a rectangular columnar shaped space.

19 Claims, 11 Drawing Sheets

(56) References Cited

U.S. PATENT DOCUMENTS

| | | | | |
|---|---|---|---|---|
| 3,438,180 | A * | 4/1969 | Kloudajohnf | F24F 8/192 96/58 |
| 3,735,560 | A * | 5/1973 | Wellman | B03C 3/38 96/62 |
| 3,883,328 | A * | 5/1975 | Spain | B03C 3/60 96/66 |
| 5,009,683 | A * | 4/1991 | Sun | F24F 8/192 96/66 |
| 5,055,115 | A * | 10/1991 | Yikai | F24F 8/192 96/59 |
| 5,268,009 | A * | 12/1993 | Thompson | B03C 3/019 96/67 |
| 5,322,550 | A * | 6/1994 | Park | B03C 3/40 96/66 |
| 5,433,772 | A * | 7/1995 | Sikora | B03C 3/32 422/120 |
| 5,456,741 | A * | 10/1995 | Takahara | B03C 3/12 95/6 |
| 5,492,557 | A * | 2/1996 | Vanella | B03C 3/017 422/121 |
| 5,614,002 | A * | 3/1997 | Chen | B03C 3/09 96/55 |
| 5,622,543 | A * | 4/1997 | Yang | B03C 3/368 96/58 |
| 5,695,549 | A * | 12/1997 | Feldman | B03C 3/0175 96/55 |
| 5,820,660 | A * | 10/1998 | Ko | B03C 3/74 96/30 |
| 5,925,170 | A * | 7/1999 | Nojima | F01N 3/01 96/71 |
| 5,993,520 | A * | 11/1999 | Yu | B03C 3/155 96/66 |
| 6,126,722 | A * | 10/2000 | Mitchell | B03C 3/09 361/226 |
| 6,126,727 | A * | 10/2000 | Lo | H01T 23/00 95/75 |
| 6,193,788 | B1 * | 2/2001 | Nojima | B03C 3/40 29/34 R |
| 6,368,392 | B1 * | 4/2002 | Ohtake | F24F 8/192 96/65 |
| 6,398,852 | B1 * | 6/2002 | Loreth | F24F 8/192 96/63 |
| 6,506,238 | B1 * | 1/2003 | Endo | B03C 3/12 96/79 |
| 7,267,712 | B2 * | 9/2007 | Chang | B03C 3/09 96/77 |
| 7,332,019 | B2 * | 2/2008 | Bias | B03C 3/72 96/15 |
| 7,402,194 | B2 * | 7/2008 | Furukawa | B03C 3/41 252/502 |
| 7,601,204 | B2 * | 10/2009 | Woodruff | F24F 3/0442 96/30 |
| 7,655,076 | B2 * | 2/2010 | Griffiths | B03C 3/47 96/64 |
| 7,824,477 | B2 * | 11/2010 | Kang | B03C 3/82 96/83 |
| 7,909,918 | B2 * | 3/2011 | Bias | B03C 3/12 96/26 |
| 8,889,079 | B2 * | 11/2014 | Zahedi | A61L 9/015 422/171 |
| 9,643,192 | B2 * | 5/2017 | Vanella | A61L 9/22 |
| 9,746,192 | B2 * | 8/2017 | Lee | F24F 8/10 |
| 9,757,736 | B2 * | 9/2017 | Vanella | B03C 3/12 |
| 9,764,334 | B2 * | 9/2017 | Kim | B03C 3/155 |
| 9,849,463 | B2 * | 12/2017 | Peczalski | B03C 3/155 |
| 9,914,134 | B2 * | 3/2018 | Jameson | B03C 3/155 |
| 9,919,587 | B2 * | 3/2018 | Wennerstrom | F24F 8/192 |
| 10,005,086 | B2 * | 6/2018 | Vanella | B03C 3/41 |
| 10,286,405 | B2 * | 5/2019 | Griffiths | B03C 3/38 |
| 10,384,517 | B2 * | 8/2019 | Jee | B03C 3/41 |
| 10,414,247 | B2 * | 9/2019 | Jee | B03C 3/41 |
| 10,639,968 | B2 * | 5/2020 | Lofvendahl | B03C 3/45 |
| 10,807,103 | B2 * | 10/2020 | Loreth | F24F 8/10 |
| 2004/0007000 | A1 * | 1/2004 | Takeda | F24F 1/0011 62/78 |
| 2004/0144249 | A1 * | 7/2004 | Kang | F24F 8/10 95/1 |
| 2005/0058582 | A1 * | 3/2005 | Paumier | B60H 3/0641 422/186.04 |
| 2007/0039462 | A1 * | 2/2007 | Helt | B03C 3/155 95/6 |
| 2007/0039472 | A1 * | 2/2007 | Bias | F24F 8/192 96/66 |
| 2007/0051237 | A1 * | 3/2007 | Furukawa | B03C 3/41 95/59 |
| 2013/0101477 | A1 * | 4/2013 | Both | B03C 3/30 422/187 |
| 2013/0232807 | A1 * | 9/2013 | Robert | B03C 3/86 34/72 |
| 2014/0377136 | A1 * | 12/2014 | Vanella | A61L 9/22 422/122 |
| 2016/0102589 | A1 * | 4/2016 | Kim | B03C 3/368 96/65 |
| 2016/0221002 | A1 * | 8/2016 | Lin | B03C 3/363 |
| 2016/0228882 | A1 * | 8/2016 | Lin | B03C 3/66 |
| 2016/0229267 | A1 * | 8/2016 | Wennerstrom | B60H 3/0078 |

* cited by examiner

ELECTRIFICATION APPARATUS FOR ELECTRIC DUST COLLECTION AND AIR CONDITIONER FOR VEHICLE INCLUDING SAME

CLAIM OF PRIORITY

This application claims priority to Korean Patent Application Ser. No. 10-2018-0084894, filed on Jul. 20, 2018, the entire contents of which are hereby incorporated by reference.

BACKGROUND

The present invention relates to an electrification apparatus for electric dust collection and an air conditioner for a vehicle including the same.

An air conditioner is a device for keeping the air in a predetermined space in a most suitable condition according to use and purpose. Generally, in the air conditioner, a compressor, a condenser, an expansion device, and an evaporator are provided, and a refrigeration cycle for compressing, condensing, expanding, and evaporating a refrigerant is driven to cool or heat the predetermined space.

The predetermined space may be variously proposed according to the place where the air conditioner is used. For example, in a case where the air conditioner is installed in a home or an office, the predetermined space may be an indoor space of a house or a building.

In addition, the predetermined space may correspond to the interior of a vehicle. Accordingly, the air conditioner for cooling or heating the interior of the vehicle can be classified as an air conditioner for a vehicle.

At this time, the air conditioner or the air conditioner for a vehicle may include an electric dust collector for electrifying and collecting dust particles in the air. In addition, the electric dust collector may be installed in a product other than the air conditioner, or the like, and for example, the electric dust collector may be installed in an air cleaner, a humidifier, or the like. In addition, the electric dust collector can be independently installed in the air to remove dust in the air.

At this time, the following prior art relating to an electric dust collector installed in the air conditioner for a vehicle has been filed and disclosed.

Related Art 1

1. Korea patent publication number: 10-2016-0015640 (publication date: Feb. 15, 2016)
2. Title of Invention: Electric dust collector for vehicle As described in the above-mentioned related art 1, the electric dust collector is mounted on the vehicle air conditioner in a state where the filter unit and the electrification unit are integrally formed with each other. In addition, the electrification unit includes an electrification plate having a plurality of circular through-holes and an electrification pin installed on the center of the through-hole. Dust particles passing through the electrification plate and the electrification pin are electrified and collected in the filter unit.

The related art 1 has the following problems.

(1) Since the through-hole is formed in the electrification plate in a circular shape, the area not penetrated through the electrification plate is relatively large. In other words, there is a problem that a flow area of the air passing through the electrification plate is relatively small.

(2) In addition, there is a problem that the flow rate of the air flowing through the air conditioner for a vehicle or the like provided with the electric dust collector is reduced and the air conditioning efficiency decreases. In addition, in order to generate the same air flow rate, a relatively large load is applied to the fan installed in the vehicle air conditioner or the like.

(3) In addition, the sucked air passes directly through the electrification plate and the electrification pin. Accordingly, relatively large foreign matters floating in the sucked air can block the through-hole. Accordingly, there is a problem that stability is not ensured due to sparking in the electrification pin or the like.

(4) In addition, as the through-hole is closed by relatively large foreign matters, the flow rate of the air passing through the electrification plate may be reduced. Accordingly, there is a problem that the electrification efficiency and the air conditioning efficiency decrease and the fan is overloaded.

SUMMARY

In order to solve such a problem, an objective of the present embodiment is to propose an electrification apparatus for electric dust collection maximizing the flow area of air and an air conditioner for a vehicle including the same.

In particular, an objective of the present invention is to propose an electrification apparatus for electric dust collection including conductive microfiber and conductive plates arranged in rectangular shape outside the conductive microfiber, and an air conditioner for a vehicle including the same.

In addition, an objective of the present invention is to propose an electrification apparatus for electric dust collection for enhancing the efficiency of dust collection or preventing foreign matters from entering through a cover frame provided with a mesh cover, a mesh sheet, or a mesh net, which have through-holes, and an air conditioner for a vehicle including the same.

According to the teachings of the present invention, there is provided an electrification apparatus for electric dust collection including: a frame which forms an outer appearance; a conductive microfiber which is installed in the frame and generates ions in the air; and conductive plates which are installed in the frame and generate a potential difference with the conductive microfiber. The conductive plates are disposed so as to surround the conductive microfiber to form an electrification space in which an electric field is generated. In this case, the electrification space is a rectangular columnar shaped space.

In addition, the conductive microfiber is positioned at the center of the electrification space. A separation distance between the conductive microfiber and the conductive plates may be different according to the direction. This is because the conductive plates are provided in a rectangular frame shape.

Meanwhile, according to the teachings of the present invention, an air conditioner for a vehicle including: a main body which has a suction port and a discharge port; and an electric dust collection assembly which is installed in the main body to remove foreign matters from the air flowing into the suction port. The electric dust collection assembly includes an electrification apparatus having a plurality of conductive microfibers and conductive plates.

At this time, the conductive plates may be provided in a rectangular frame shape around any one of the plurality of conductive microfibers.

According to the proposed embodiment, since the conductive plates are provided so as to surround the conductive microfiber in a rectangular shape, there is an advantage that a space in which air cannot flow or is not electrified can be minimized.

In addition, there is an advantage that it is possible to maximize the flow area of the air to increase the flow efficiency, and to reduce the load of the fan which forces the flow of air. In addition, there is an advantage that the air conditioning efficiency of the air conditioner in which the electrification apparatus is installed can increase.

In addition, there is an advantage that it is possible to maximize the electrification space electrified by one conductive microfiber, thereby increasing the electrification efficiency.

In addition, there is an advantage that relatively large foreign matters can be prevented from intruding through the frame provided with the mesh cover, the mesh sheet, and the mesh net. Thereby, there is an advantage that damage or the like of the electrification apparatus due to foreign matters can be prevented.

DETAILED DESCRIPTION OF THE EMBODIMENTS

Figure 1:
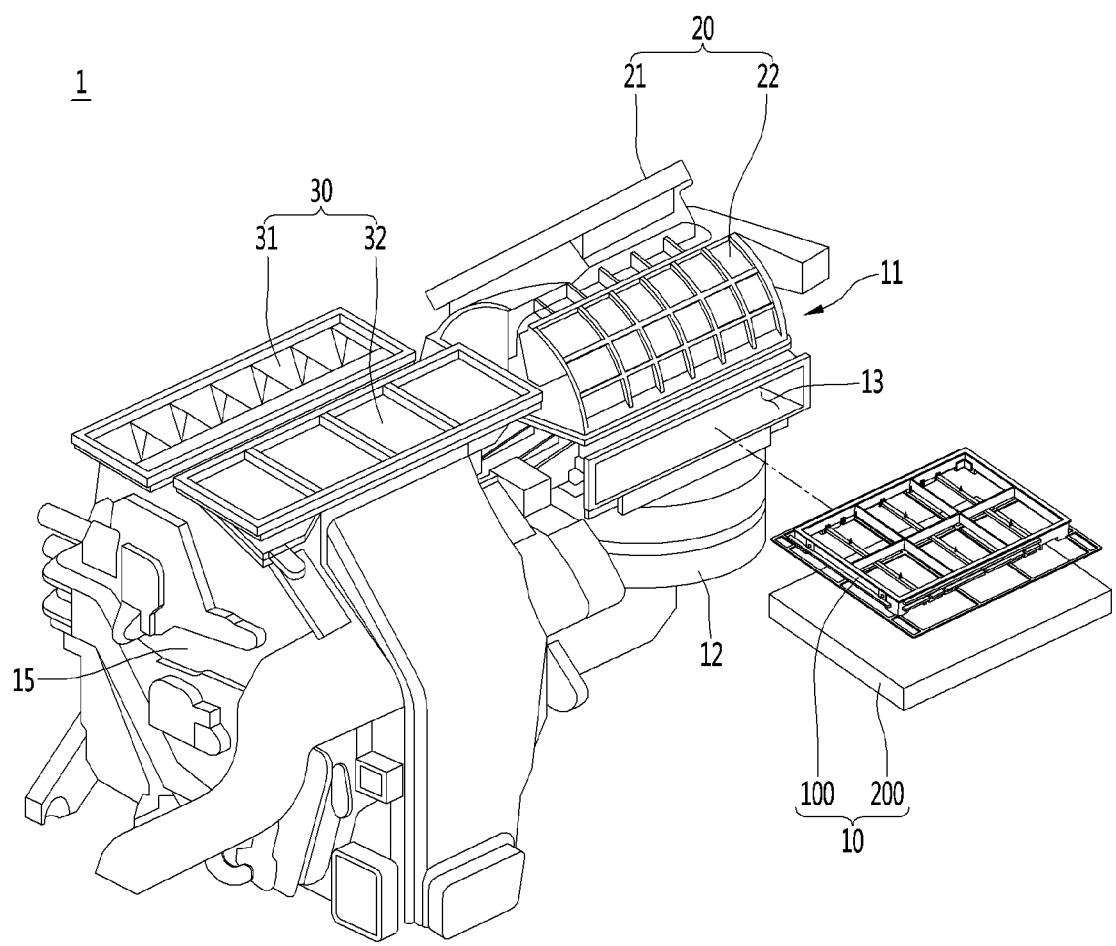
FIG. 1 is a view illustrating an air conditioner for a vehicle and an electric dust collection assembly installed therein according to a first embodiment of the present invention.

Hereinafter, some embodiments of the present invention will be described in detail with reference to exemplary drawings. It is to be noted that, in adding reference numerals to the constituent elements of the drawings, the same constituent elements are denoted by the same reference numerals whenever possible, even if the same constituent elements are illustrated in different drawings. In addition, in the following description of the embodiments of the present invention, a detailed description of known functions or configurations incorporated herein will be omitted in a case where it is determined that the detailed description thereof hinders understanding of the embodiment of the present invention.

In addition, in describing the constituent elements of the embodiment of the present invention, terms such as first, second, A, B, (a), and (b) may be used. These terms are intended to distinguish the constituent elements from other constituent elements, and the terms do not limit the nature, order or sequence of the constituent elements. In a case where a constituent element is described as being "connected", "coupled", or "accessed" to another constituent element, although the constituent element may be directly connected or accessed to the other constituent element, it should be understood that another constituent element may be "connected", "coupled", or "accessed" between the respective constituent elements.

FIG. 1 is a view illustrating an air conditioner for a vehicle and an electric dust collection assembly installed therein according to a first embodiment of the present invention.

As illustrated in FIG. 1, the air conditioner 1 for a vehicle according to the teachings of the present invention includes a main body 11, 15 which forms an outer appearance. The main body may be divided into a suction main body 11 on which the suction port 20 is formed and a discharge main body 15 in which the discharge port 30 is formed.

The suction main body 11 and the discharge main body 15 are connected to each other to allow air to flow. Specifically, the suction main body 11 and the discharge main body 15 are connected to each other so that air flows from the suction main body 11 to the discharge main body 15. However, this is an example, and the air conditioner 1 for a vehicle may be provided as an integral main body.

A plurality of the suction port 20 and a plurality of the discharge port 30 may be formed in the suction main body 11 and the discharge main body 15, respectively.

The suction port 20 includes an indoor suction port 21 and an outdoor suction port 22. The indoor suction port 21 is understood as an opening through which the air inside the vehicle provided with the air conditioner 1 for a vehicle flows into the inside of the main body 11. In addition, it is to be understood that the outdoor suction port 22 is an opening through which the outside air of the vehicle flows into the inside of the main body 11.

The discharge port 30 includes a front discharge port 31 and a defrost discharge port 32. The front discharge port 31 is understood as an opening through which the air discharged from the main body 11 flows into the inside of the vehicle. In addition, the defrost discharge port 32 is understood as an opening through which the air discharged from the main body 11 flows into the windshield of the vehicle. Through the defrost discharge port, it is possible to remove frost formed in the windshield of the vehicle.

This is an example, and the suction port 20 and the discharge port 30 may be formed in various positions and numbers. For example, the discharge port 30 may further include a discharge port that discharges air to the lower side of the vehicle or a discharge port that discharges air to the rear side of the vehicle.

In addition, the air conditioner 1 for a vehicle includes a fan and a heat exchanger installed inside the main bodies 11 and 15 but is omitted in FIG. 1 for the convenience of illustration.

Specifically, a fan may be installed inside the suction main body 11. In other words, the fan can be disposed adjacent to the suction port 20. As the fan is driven, air flows into the suction main body 11 through the suction port 20. Then, air can flow from the suction main body 11 to the discharge main body 15.

A heat exchanger or a heater may be disposed in the discharge main body 15. Accordingly, the air flowing into the discharge main body 15 passes through the heat exchanger or the like and can be cooled or heated and may be discharged to the inside of the vehicle through the discharge port 30.

In addition, the air conditioner 1 for a vehicle may further include a plurality of suction ports 20 and a damper (not illustrated) for selectively opening the discharge ports 30. For example, the damper may open any one of the indoor suction port 21 and the outdoor suction port 22 and close the other. In addition, the damper may open at least one of the plurality of discharge ports 30.

In addition, in the air conditioner 1 for a vehicle according to the teachings of the present invention, an electric dust collection assembly 10 is installed. The electric dust collection assembly 10 corresponds to a configuration in which dust particles or the like in the air flowing into the air conditioner 1 for a vehicle are electrified and collected.

At this time, the electric dust collection assembly 10 may be installed in another product other than the air conditioner 1 for a vehicle. Accordingly, FIG. 1 corresponds to an example in which the electric dust collection assembly 10 is installed. In addition, the electric dust collection assembly 10 may be installed in an independent product (for example, an air purifier) to remove dust particles in the air.

The electric dust collection assembly 10 includes an electrification apparatus 100 for electric dust collection (hereinafter, electrification apparatus) and a collector 200 for electric dust collection (hereinafter, collector).

The electrification apparatus 100 functions to electrify foreign matters such as dust particles in the air. The collector 200 functions to collect dust particles and the like electrified by the electrification apparatus 100 and remove dust particles and the like from the air.

The electrification apparatus 100 includes the conductive microfiber 120 and the conductive plate 130, which will be described later. A high voltage is applied to the conductive microfiber 120, and a ground electrode is applied to the conductive plate 130.

Accordingly, the electrification apparatus 100 generates ions in the air to form an electric field. At this time, it is understood that the conductive plate 130 generates a potential difference with the conductive microfiber 120 to form an electric field. In addition, electrified particles can be collected on the conductive plate 130.

The collector 200 may be made of various materials collecting the electrified particles by the electrification apparatus 100. For example, the collector 200 may be a porous fiber filter such as a nonwoven fabric. The surface of the collector 200 may be applied, coated or attached with a conductive material. Then, a predetermined current is applied to the collector 200, so that the electrified dust particles and the like can be collected.

In summary, dust particles or the like in the air passing through the electric dust collection assembly 10 are coupled with the ions generated in the electrification apparatus 100 and are electrified. The electrified dust particles and the like can be collected in the electrification apparatus 100 or the collector 200.

Thus, the electrification apparatus 100 can function not only to generate ions but also to collect electrified dust particles and the like. Therefore, the electrification apparatus 100 may be referred to as a 'primary filter' and the collector 200 as a 'secondary filter'. Dust particles or the like in the air can be removed more easily as dust particles or the like in the air pass through the primary filter and the secondary filter in order.

At this time, in the electric dust collection assembly 10 according to the teachings of the present invention, the electrification apparatus 100 and the collector 200 are provided as separate devices, and thus is referred to as "assembly" in which a separate device is assembled or adjacently installed.

Specifically, the electrification apparatus 100 and the collector 200 can be produced and distributed through different manufacturing processes and distribution processes. In addition, the electrification apparatus 100 and the collector 200 may be coupled to each other by a separate coupling member or the like.

In addition, as described above, the electrification apparatus 100 can perform both the function of generating ions and the function of collecting dust particles. Accordingly, the electrification apparatus 100 may be installed as an independent product separately from the collector 200.

In other words, the electrification apparatus 100 may be installed in a general air conditioner or other products other than the air conditioner 1 for a vehicle. In addition, the electrification apparatus 100 may be installed independently.

In addition, the electrification apparatus 100 and the collector 200 may be installed in a predetermined product, respectively. For example, the electrification apparatus 100 and the collector 200 may be installed in the air conditioner 1 for a vehicle, respectively.

With reference to FIG. 1, the air conditioner 1 for a vehicle is provided with a dust collection installation portion 13 on which the electric dust collection assembly 10 is installed. Specifically, the dust collection installation portion 13 is formed in the suction main body 11 adjacent to the suction port 20. Particularly, the dust collection installation portion 13 is disposed at the lower side in the flow direction of the air flowing into the suction port 20.

This is because the air flowing into the suction port 20 is firstly passed through the electric dust collection assembly 10. In summary, the air flowing into the air conditioner 1 for a vehicle passes through the electric dust collection assembly 10 first, and dust particles and the like can be removed. Accordingly, it is possible to prevent foreign matters from adhering to the fan, the heat exchanger, and the like.

In addition, the air conditioner 1 for a vehicle is provided with a fan installation portion 12 on which the fan is installed. Specifically, the fan installation portion 12 is formed in the suction main body 11 adjacent to the suction port 20. Particularly, the fan installation portion 12 is disposed below the flow direction of air in the dust collection installation portion 13.

Therefore, in the suction main body 11, the suction port 20, the dust collection installation portion 13, and the fan mounting unit 12 are disposed in order in the air flow direction. Accordingly, the air flowing into the suction port 20 passes through the electric dust collection assembly 10 and the fan in order and flows into the discharge main body 15.

At this time, the electrification apparatus 100 and the collector 200 may be installed in the dust collection installation portion 13, respectively. Particularly, the collector 200 is disposed below in the flow direction of air in the electrification apparatus. Accordingly, the air flowing into the suction port 20 can pass through the electrification apparatus 100 and the collector 200 in order.

The electrification apparatus 100 may be installed in the dust collection installation portion 13 in a state where the collector 200 is seated. In other words, the electrification apparatus 100 and the collector 200 may be overlapped and seated on the dust collection installation portion 13.

In addition, a portion for fixing the electrification apparatus 100 may be formed on the inside of the dust collection installation portion 13. Accordingly, the electrification apparatus 100 may be installed in the dust collection installation portion 13, and the collector 200 may be installed in the lower portion of the electrification apparatus 100.

As described above, the electrification apparatus 100 and the collector 200 can be managed, respectively, since the electrification apparatus 100 and the collector 200 are installed, respectively. For example, the user can separate, replace, and clean the collector 200 only in the air conditioner 1 for a vehicle.

In particular, the replacement cycles of the electrification apparatus 100 and the collector 200 may be different from each other. Generally, since a larger amount of dust particles are collected in the collector 200, the replacement cycle of the collector 200 can be shorter than that of the electrification apparatus 100. Therefore, the user can replace only the collector 200 without the need to separate the electrification apparatus 100.

Hereinafter, the electrification apparatus 100 will be described in detail.

Figure 2:
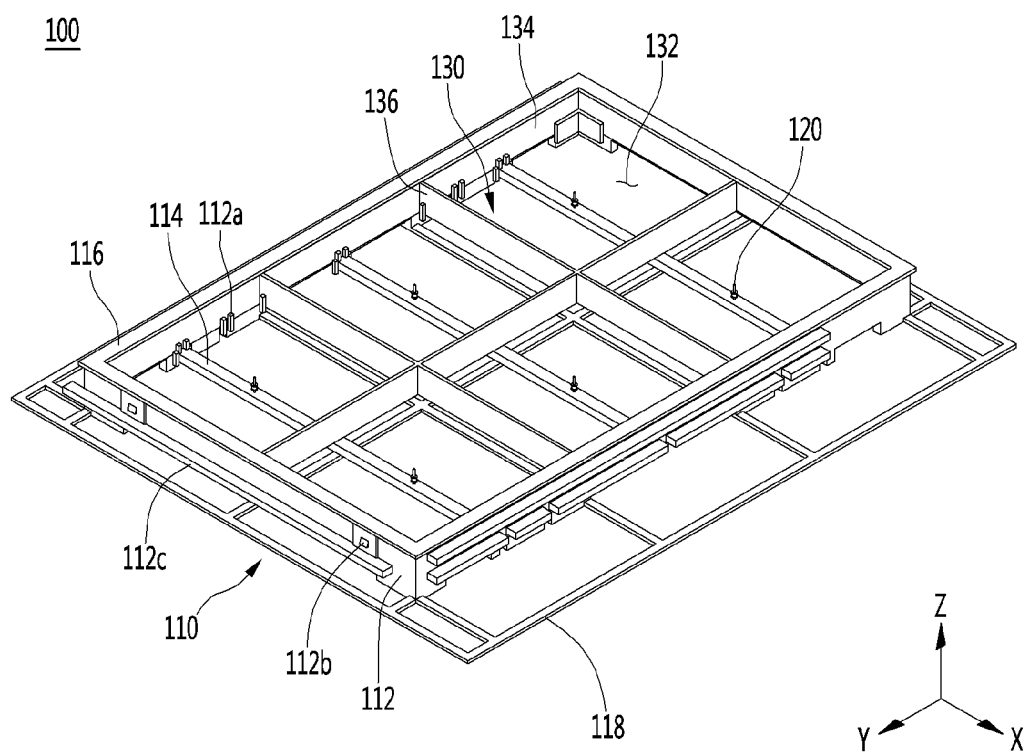
FIG. 2 and FIG. 3 are views illustrating an electrification apparatus for electric dust collection for the first embodiment of the present invention.
Figure 3:
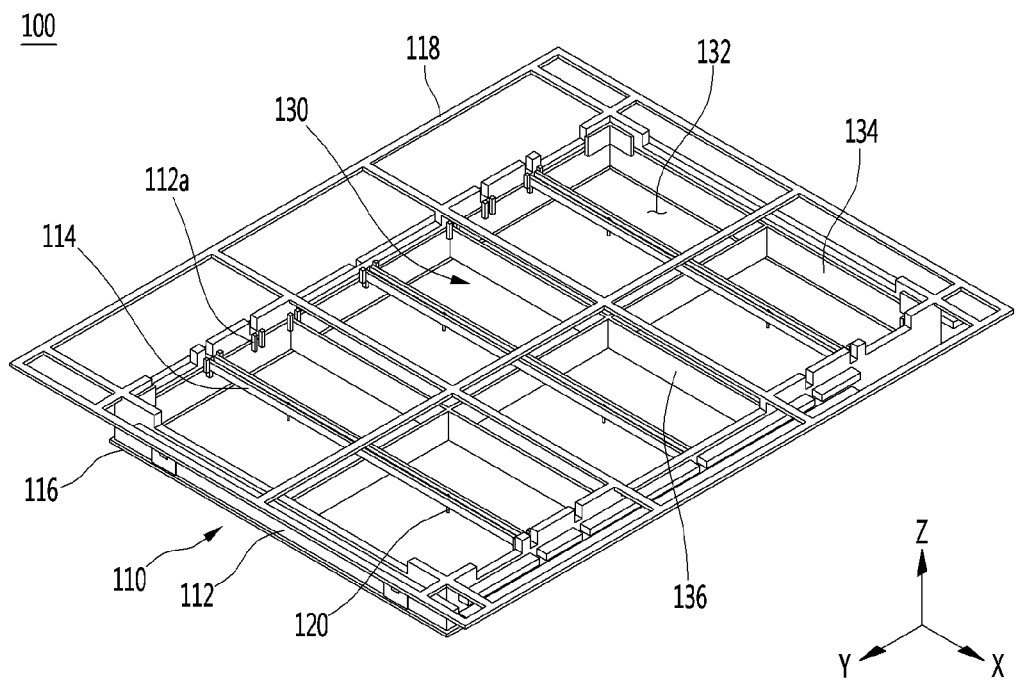
Figure 4:
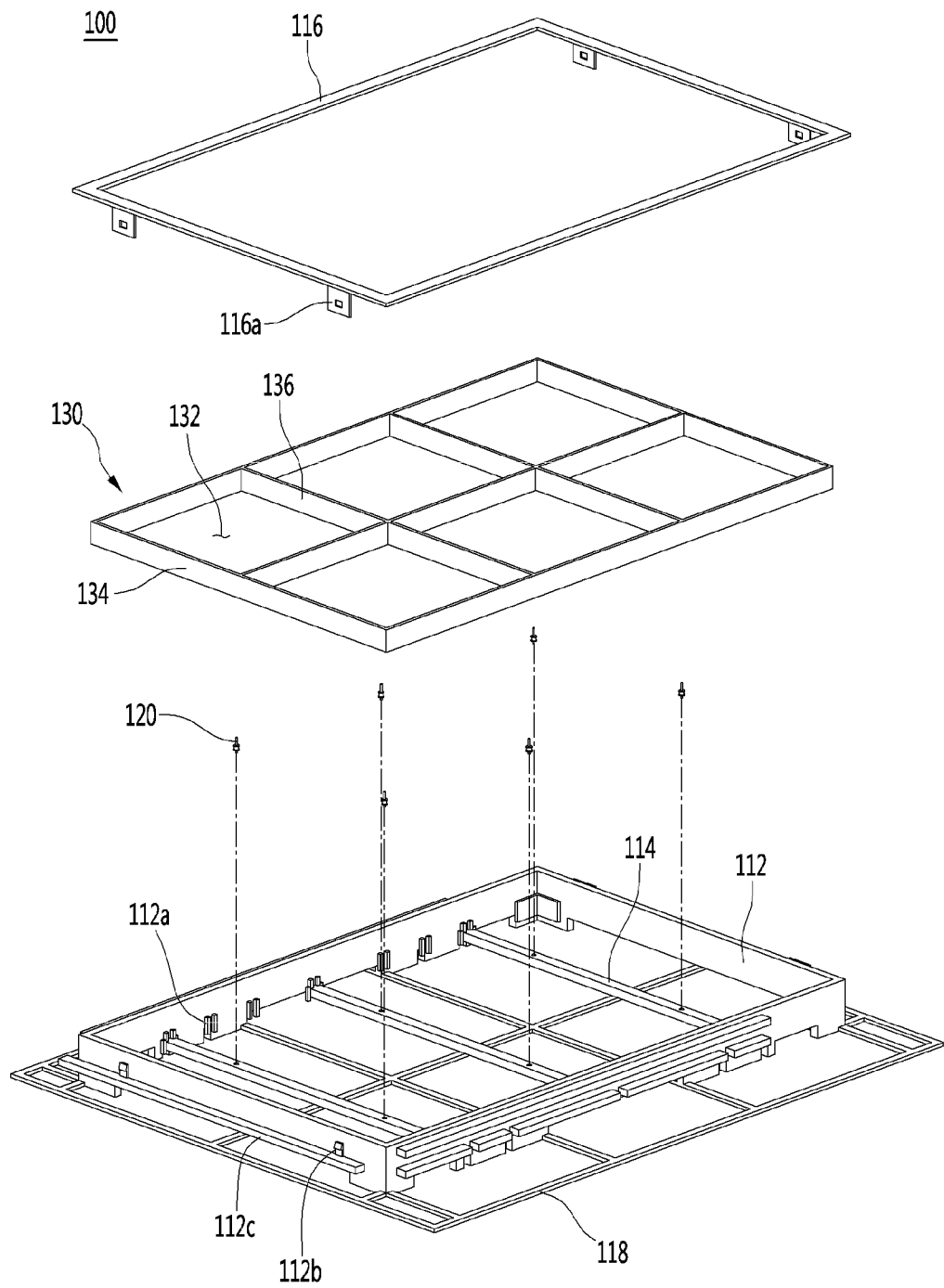
FIG. 4 is an exploded view illustrating the electrification apparatus for electric dust collection according to the first embodiment of the present invention.

FIGS. 2 and 3 are views illustrating an electrification apparatus for electric dust collection according to the first embodiment of the present invention, and FIG. 4 is an exploded view illustrating the electrification apparatus for electric dust collection according to the first embodiment of the present invention.

FIG. 2 is a front perspective view of the electrification apparatus 100, and FIG. 3 is a rear perspective view of the electrification apparatus 100. In addition, FIG. 4 is a front perspective view of the electrification apparatus 100 in which the respective components are separated.

In addition, for the convenience of explanation, FIGS. 2 to 4 illustrate X, Y, and Z axes perpendicular to each other. In this case, the X, Y, and Z axes are illustrated to illustrate the relationship between each other, and the (+) and (−) directions of each axis are not distinguished.

As illustrated in FIGS. 2 to 4, the electrification apparatus 100 includes a frame 110 which forms an outer appearance of the electrification apparatus 100, conductive microfiber 120 and a conductive plate 130 which are provided on the frame 110.

The frame 110 is understood as a configuration for disposing and fixing the conductive microfiber 120 and the conductive plate 130 at predetermined positions. In addition, the frame 110 may be mounted a space in which the electrification apparatus 100 is installed, for example, the dust collection installation portion 13 of the air conditioner 1 for a vehicle described above.

In addition, the frame 110 is made of a nonconductive material and may be formed of, for example, plastic. In addition, the frame 110 may be formed in various shapes through an injection process or the like.

The conductive microfiber 120 understood as configuration which is discharged by a high voltage to ionize molecules in the air. For example, the conductive microfiber 120 can generate anions such as OH—, O—, and the like, or cations such as H+ in the air.

The conductive microfiber 120 is connected to electric wires for applying a high voltage but are omitted in FIGS. 2 to 4 for the sake of convenience. In addition, the conductive microfiber 120 may be understood as one end portion of an electric wire to which a high voltage is applied.

In addition, the conductive microfiber 120 includes carbon fibers. The carbon fibers are formed into microfibers having a diameter in the micrometer unit. When a high voltage is applied to the carbon fibers, ions are generated in the air by corona discharge.

At this time, the conductive microfiber 120 is provided in the form of a carbon brush in which hundreds or thousands of carbon fibers form one bundle. Hereinafter, one conductive microfiber 120 means one carbon brush.

In addition, the conductive microfiber 120 is disposed on the frame 110 so as to extend in the Z-axis direction. At this time, the Z-axis may correspond to an axis extending in the air flow direction. In summary, the conductive microfiber 120 may be disposed on the frame 110 in parallel with the flow direction of the air.

It is understood that the conductive plate 130 forms an electric field with the conductive microfiber 120. In addition, a ground electric wire to which a ground electrode is applied is connected to the conductive plate 130. Accordingly, between the conductive plate 130 and the conductive microfiber 120, a potential difference is generated and an electric field can be formed.

In addition, electrons can be moved to the ground electrode. Accordingly, high-density ions can be generated between the conductive microfiber 120 and the conductive plate 130. In addition, the electrification efficiency of dust particles and the like can be improved due to the electric field formed between the conductive microfiber 120 and the conductive plate 130.

In addition, the conductive plate 130 is formed of a conductive material such as metal. Accordingly, the conductive plate 130 can be understood as a metal plate having a predetermined thickness.

In addition, since the conductive plate 130 is provided as a flat plate having a predetermined area along the Z-axis, predetermined dust particles and the like can be collected. In other words, the electrified dust particles and the like can be collected in the conductive plate 130. Therefore, the electrification apparatus 100 can also perform a function of collecting the electrified dust particles and the like.

In addition, the conductive plate 130 is disposed to surround the conductive microfiber 120. Specifically, the conductive plate 130 forms a predetermined space to surround the conductive microfiber 120. In addition, the predetermined space may be understood as a space in which an electric field is formed.

Hereinafter, the space formed by the conductive plate 130 is referred to as an electrification space 132. At this time, the electrification space 132 means space closed in the X-Y-axis direction by the conductive plate 130 and opened in the Z-axis direction.

In particular, the conductive plate 130 according to the teachings of the present invention forms a square columnar space. It should be understood that the conductive plate 130 is provided in a square frame shape based on the conductive microfiber 120.

Specifically, the electrification space 132 has a rectangular shape on a plane, and a rectangular columnar space extending in the Z-axis can be formed. At this time, the rectangular shape formed on the X-Y plane may correspond to a square. In other words, the electrification space 132 can be understood as a square columnar space.

The conductive microfiber 120 is positioned at the center of the electrification space 132. Specifically, the conductive microfiber 120 is positioned at the center of the electrificaton space 132 on the X-Y plane and extend in the Z-axis.

At this time, the electrification space 132 refers to a space formed to surround one conductive microfiber 120. Therefore, the electrification space 132 may be formed corresponding to the number of the conductive microfibers 120.

In summary, the conductive plate 130 forms a rectangular cross-section perpendicular to the flow direction of air. The conductive microfiber 120 is positioned at the center of a rectangular cross-section.

The electrification apparatus 100 may include a plurality of conductive microfibers 120. The conductive plate 130 may form a plurality of electrification spaces 132 corresponding to the plurality of conductive microfibers 120.

The plurality of conductive microfibers 120 are disposed apart from each other in the X-Y plane. In addition, each of the conductive microfibers 120 may be disposed at the same interval as the neighboring conductive microfibers 120. In addition, the plurality of conductive microfibers 120 may be arranged in parallel with the adjacent conductive microfibers 120 along the X-axis or the Y-axis. For example, as illustrated in FIGS. 2 to 4, six conductive microfibers 120 can be provided.

The plurality of electrification spaces 132 are formed on the X-Y plane in a state of being separated from each other so as to correspond to the plurality of conductive microfibers 120. The conductive plate 130 includes an outer plate 134 for forming the plurality of electrification spaces 132 and an inner plate 136 for separating the plurality of electrification spaces 132.

The outer plate 134 can be understood as a configuration that forms an outer appearance of the conductive plate 130. Specifically, the outer plate 134 may be provided in a rectangular frame shape.

The outer plate 134 forms a space in which the plurality of electrification spaces 132 are combined. Specifically, the outer plate 134 has a rectangular shape in the X-Y plane and forms a rectangular columnar space extending in the Z-axis.

The inner plate 136 may be understood as a configuration that divides the space formed by the outer plate 134 into the electrification spaces 132. Accordingly, both ends of the inner plate 136 can be connected to the outer plate 134. In particular, the inner plate 136 extends in the X-axis or the Y-axis. For example, the inner plate 136 may divide the space formed by the outer plate 134 into six electrification spaces 132.

At this time, the outer plate 134 and the inner plate 136 may be integrally formed with each other. Alternatively, the outer plate 134 and the inner plate 136 may be separately fabricated and coupled with each other.

In the electrification apparatus of the related art, the electrification space is formed into a cylindrical shape around the conductive microfibers. Thereby, air cannot flow between the electrification spaces, or a death zone can be formed which cannot be electrified.

However, in a case where the electrification space is formed into a square columnar shape as in the present invention, there is no dead space between the electrification spaces. Therefore, the electrification space per the same space can be maximized. Accordingly, the flow rate of the air passing through the electrification space can be maximized.

The frame 110 includes a main body frame 112 on which the conductive plate 130 is installed and an installation frame 114 on which the conductive microfibers 120 are installed.

The main body frame 112 can be understood as a configuration that forms an outer appearance of the frame 110.

In addition, the outer plate 134 may be fitted to the main body frame 112. Accordingly, the main body frame 112 is provided in a shape corresponding to the outer plate 134.

Therefore, the main body frame 112 is provided in a rectangular frame shape as in the outer plate 134. Specifically, the outer plate 134 is installed on the main body frame 112 such that the outer surface of the outer plate 134 is in contact with the inner surface of the main body frame 112.

In addition, the main body frame 112 is provided with a plurality of fixing protrusions 112a which are in contact with the inner surface of the outer plate 134. In addition, the outer plate 134 may be fixed to the main body frame 112 by means of a bonding member such as a bond.

In addition, the frame 110 further includes a over frame 116 coupled to an upper end of the main body frame 112. The cover frame 116 may be coupled to the main body frame 112 to cover the upper end of the outer plate 134. In other words, the outer plate 134 may be fixed in the Z-axis by coupling of the main body frame 112 and the cover frame 116.

The cover frame 116 and the main body frame 112 can be hooked. For example, the main body frame 112 may have a hook 112b protruding outwardly, and the cover frame 116 may be formed with a hook groove 116a into which the hook 112b is inserted.

In addition, the main body frame 112 is formed with a frame installation portion 112c protruding outwardly and extending along the main body frame 112. The frame installation portion 112c may correspond to a portion which is seated in a product on which the electrification apparatus 100 is installed.

For example, protrusions on which the frame installation portion 112c is seated may be formed on the inside of the dust collection installation portion 13. Therefore, the electrification apparatus 100 may be installed in the dust collection installation portion 13 such that the frame installation portion 112c is seated on the protrusion.

In addition, the frame installation portion 112c may be formed on the outer surface of the main body frame 112. In other words, the frame installation portion 112c may be formed on all four surfaces forming the main body frame 112. Accordingly, the electrification apparatus 100 can be installed by the frame installation portion 112c irrespective of the direction in which the electrification apparatus 100 is installed in the product.

For example, the main body frame 112 or the conductive plate 130 is formed as a rectangular frame having a long surface and a short surface. With reference to FIG. 1, the electrification apparatus 100 is inserted into the dust collection installation portion 13 such that end surface of the electrification apparatus 100 is disposed on both sides of the dust collection installation portion 13. Accordingly, the frame installation portion 112c formed on the end surface of the main body frame 112 can be seated on the inner surface of the dust collection installation portion 13.

The installation frame 114 is installed in an inside of the main body frame 112 in a state of extending into one side. In other words, both ends of the installation frame 114 are fixed to the main body frame 112. In the installation frame 114, a fixing groove 114a into which the conductive microfibers 120 are inserted is formed. At this time, the fixing grooves 114a are formed to correspond to the number of the conductive microfibers 120.

In addition, the frame 110 may further include an auxiliary frame 118. The auxiliary frame 118 can be understood as a configuration that maintains the rigidity of the frame 110. In other words, the auxiliary frame 118 corresponds to a configuration for preventing the main body frame 112 and the installation frame 114 from being deformed. Accordingly, the auxiliary frame 118 may have various shapes according to the design and may be omitted.

As described above, the frame 110 may be formed by an injection process. Accordingly, although the frame 110 has been described in detail, the frame 110 may be integrally formed.

Hereinafter, the shape and arrangement of the conductive microfibers 120 and the conductive plate 130 according to the teachings of the present invention will be described in detail.

Figure 5:
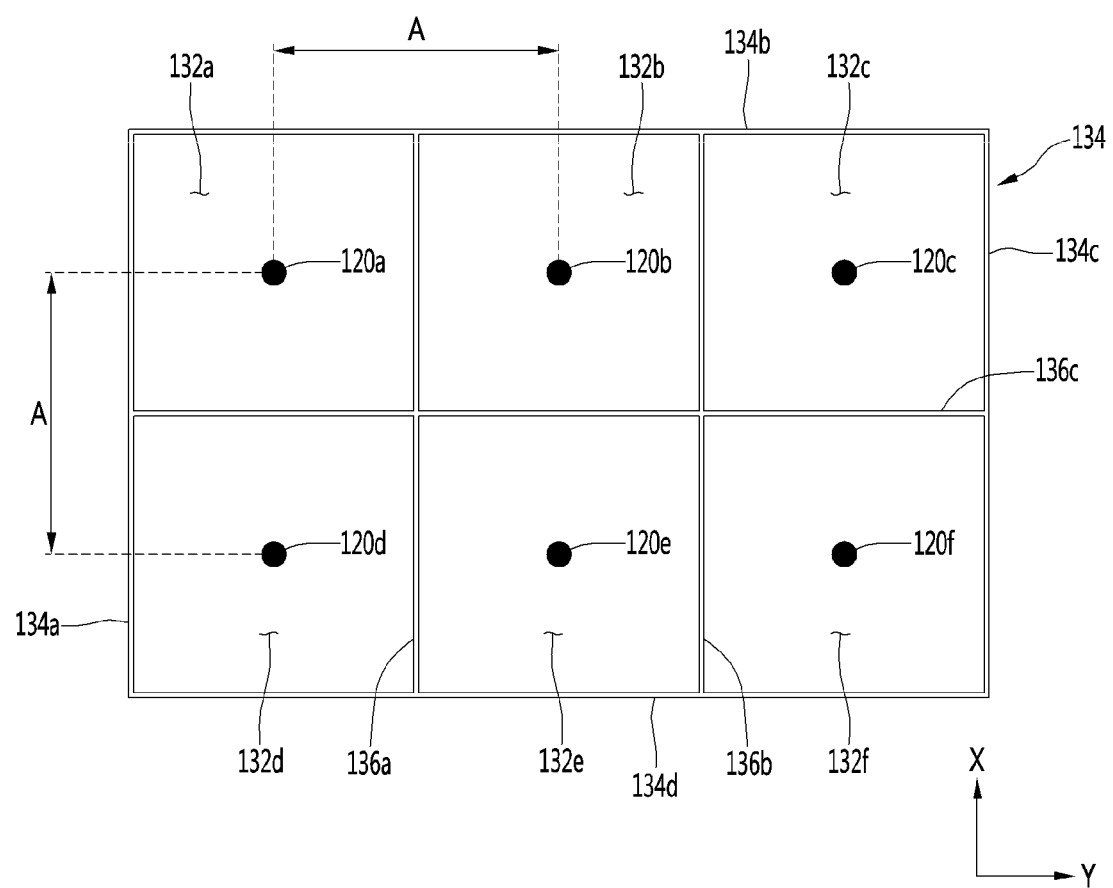
FIG. 5 is a view illustrating conductive microfiber and conductive plates of the electrification apparatus for electric dust collection according to the first embodiment of the present invention.

FIG. 5 is a view illustrating conductive microfibers and conductive plates of an electrification apparatus for electric dust collection according to the first embodiment of the present invention.

FIG. 5 is a view illustrating the conductive microfibers 120 and the conductive plates 130 on the X-Y plane. At this time, the Z-axis means a direction extending vertically forward or backward from the paper.

As described above, the conductive microfibers 120 extend in the Z-axis and are installed in the frame 110. The conductive plate 130 has a length in the Z-axis direction so as to correspond to the length of the conductive microfibers 120 in the Z-axis direction.

As illustrated in FIG. 5, six conductive microfibers 120 are provided. It is an example and it is not limited thereto. For the convenience of explanation, the conductive microfibers 120 includes a first microfiber 120a, a second microfiber 120b, a third microfiber 120c, a fourth microfiber 120d, a fifth microfiber 120e, and a sixth microfiber 120f.

The second microfiber 120b and the fourth microfiber 120d are disposed adjacent to each other on the basis of the first microfiber 120a. At this time, being disposed adjacently means being disposed closest to each other.

The second microfiber 120b is spaced apart from the first microfiber 120a in the Y-axis direction. In other words, the first microfiber 120a and the second microfiber 120b are disposed in parallel along the Y-axis direction. At this time, the separation distance between the first microfiber 120a and the second microfiber 120b is defined as an arbitrary distance 'A'.

The fourth microfiber 120d is spaced apart from the first microfiber 120a in the X-axis direction. In other words, the first microfiber 120a and the fourth microfiber 120d are arranged in parallel along the X-axis direction. At this time, the separation distance between the first microfiber 120a and the fourth microfiber 120d may correspond to A. In other words, the first microfiber 120a is spaced apart by the same distance as the adjacent second microfiber 120b and the fourth microfiber 120d.

The third microfiber 120c is spaced apart from the second microfiber 120b by A in the Y-axis direction. In other words, the first microfiber 120a, the second microfiber 120b, and the third microfiber 120c are arranged in parallel along the Y-axis direction.

The fifth microfiber 120e is spaced apart from the fourth microfiber 120d by A in the Y-axis direction. In addition, the sixth microfiber 120f is spaced apart from the fifth microfiber 120e by A in the Y-axis direction. In other words, the fourth microfiber 120d, the fifth microfiber 120e, and the sixth microfiber 120f are arranged along the Y-axis direction.

The fifth microfiber 120e are spaced apart from the second microfiber 120b by A in the X-axis direction. In addition, the sixth microfiber 120f is spaced apart from the third microfiber 120c by A in the X-axis direction.

In summary, the first, second, fourth, and fifth microfibers 120a, 120b, 120d, and 120e correspond to vertexes of a square having a length A on one side on the X-Y plane. The second, third, fifth, and sixth microfibers 120b, 120c, 120e, and 120f correspond to vertexes of a square having a length A on one side on the X-Y plane.

As the number of the conductive microfibers 120 or the installation space of the electrification apparatus 100 is changed, the conductive microfibers 120 may arranged differently. However, the plurality of conductive microfibers 120 may be disposed at positions corresponding to vertexes of rectangle.

In addition, as illustrated in FIG. 5, six electrification spaces 132 corresponding to the conductive microfibers 120 are formed on the conductive plate 130. For the convenience of explanation, six electrification spaces 132 include a first electrification space 132a, a second electrification space 132b, a third electrification space 132c, a fourth electrification space 132d, a fifth electrification space 132e, and a sixth electrification space 132f.

In addition, the first to sixth electrification spaces 132 are formed to surround the first to sixth microfibers 120, respectively. Therefore, the first to sixth microfibers 120 are disposed at the centers of the first to sixth electrification spaces 132, respectively. In addition, each electrification space 132 is formed in a square whose a length of each side is A.

In addition, as described above, the outer plate 134 forms the plurality of electrification spaces 132. In other words, the outer plate 134 forms the first to sixth electrification spaces 132.

Specifically, the outer plate 134 includes a first outer plate 134a which extends in the X-axis direction, a second outer plate 134b which extends in the Y-axis direction at one end of the first outer plate 134a, and a third outer plate 134c which extends in the X-axis direction at one end of the second outer plate 134b.

In addition, the outer plate 134 includes a fourth outer plate 134d extending in the Y-axis direction so that the third outer plate 134c and the first outer plate 134a are connected to both ends, respectively. In other words, the outer plate 134 is formed as a rectangular frame, and the first to fourth outer plates 134 correspond to the respective corners.

Specifically, the outer plate 134 forms a rectangle which is 2A in the X-axis direction and 3A in the Y-axis direction. In other words, the first and third outer plates 134a and 134c extend in the X-axis by 2A and the second and fourth outer plates 134b and 134d extend in the Y-axis by 3A.

The first outer plate 134a is spaced apart from the first and fourth fine particles 120a and 120d by A/2 in the Y-axis direction. In addition, the third outer plate 134a is spaced apart from the third and sixth fine particles 120c and 120f by A/2 in the Y-axis direction.

In addition, the second outer plate 134b is spaced apart from the first, second, and third fine particles 120a, 120b, and 120c by A/2 in the X-axis direction. In addition, the fourth outer plate 134d is spaced apart from the fourth, fifth, and sixth fine particles 120d, 120e, and 120f by A/2 in the X-axis direction.

In addition, the inner plate 136 separates the first to sixth electrification spaces 132. In other words, the inner plate 136 divides the first to sixth electrification spaces 132 formed by the outer plate 134 into electrification spaces 132, respectively.

The inner plate 136 includes a first inner plate 136a and a second inner plate 136b for connecting the second outer plate 134b and the fourth outer plate 134d. The first inner plate 136a and the second inner plate 136b extend in the X-axis direction and are spaced apart from each other in the Y-axis direction.

In addition, the inner plate 136 further includes a third inner plate 136c connecting the first outer plate 134a and the third outer plate 134c. The third outer plate 134c extends in the Y-axis direction through the first and second inner plates 136a and 136b.

In addition, the first and second inner plates 136a and 136b extend in the X-axis by 2A and the third inner plate 134c extends in the Y-axis by 3A.

The first electrification space 132a is formed by the first and second outer plates 134a and 134b and the first and third inner plates 136a and 136c, respectively. The second electrification space 132b is formed by the second outer plate 134b and the first, second and third inner plates 136a, 136b, and 136c.

At this time, as illustrated in FIG. 5, the first electrification space 132a and the second electrification space 132b are separated from, each other by the first inner plate 136a. In other words, the first inner plate 136a is disposed between the first electrification space 132a and the second electrification space 132b.

Since the first inner plate 136a corresponds to a flat plate having a very small thickness in the Z-axis direction, it can be understood that the area of the first inner plate 136a is very small. In other words, it can be understood that the first inner plate 136a provides a very small influence on the air flow.

At this time, the outer plate 134 and the inner plate 136 are separately referred to, but the conductive plate 130 may be integrally formed. In addition, the conductive plate 130 may be manufactured differently from the distinguished name.

Hereinafter, another embodiment of the electrification apparatus 100 will be described. At this time, the same reference numerals are used for the same configurations as those described above, and a description thereof is referred.

Figure 6:
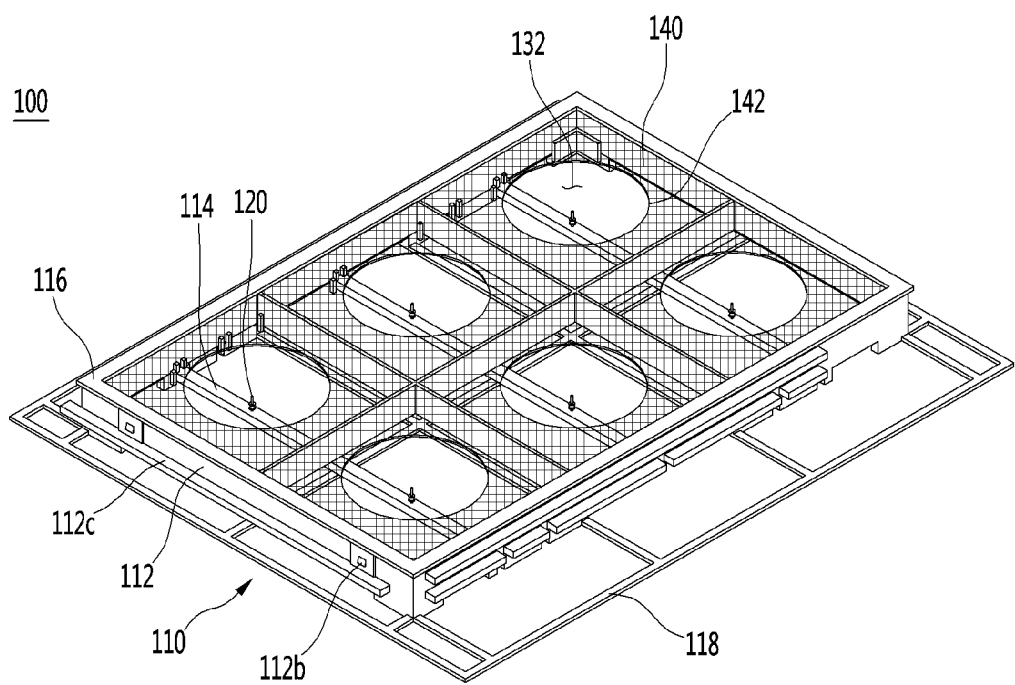
FIG. 6 is a view illustrating an electrification apparatus for electric dust collection according to a second embodiment of the present invention.
Figure 7:
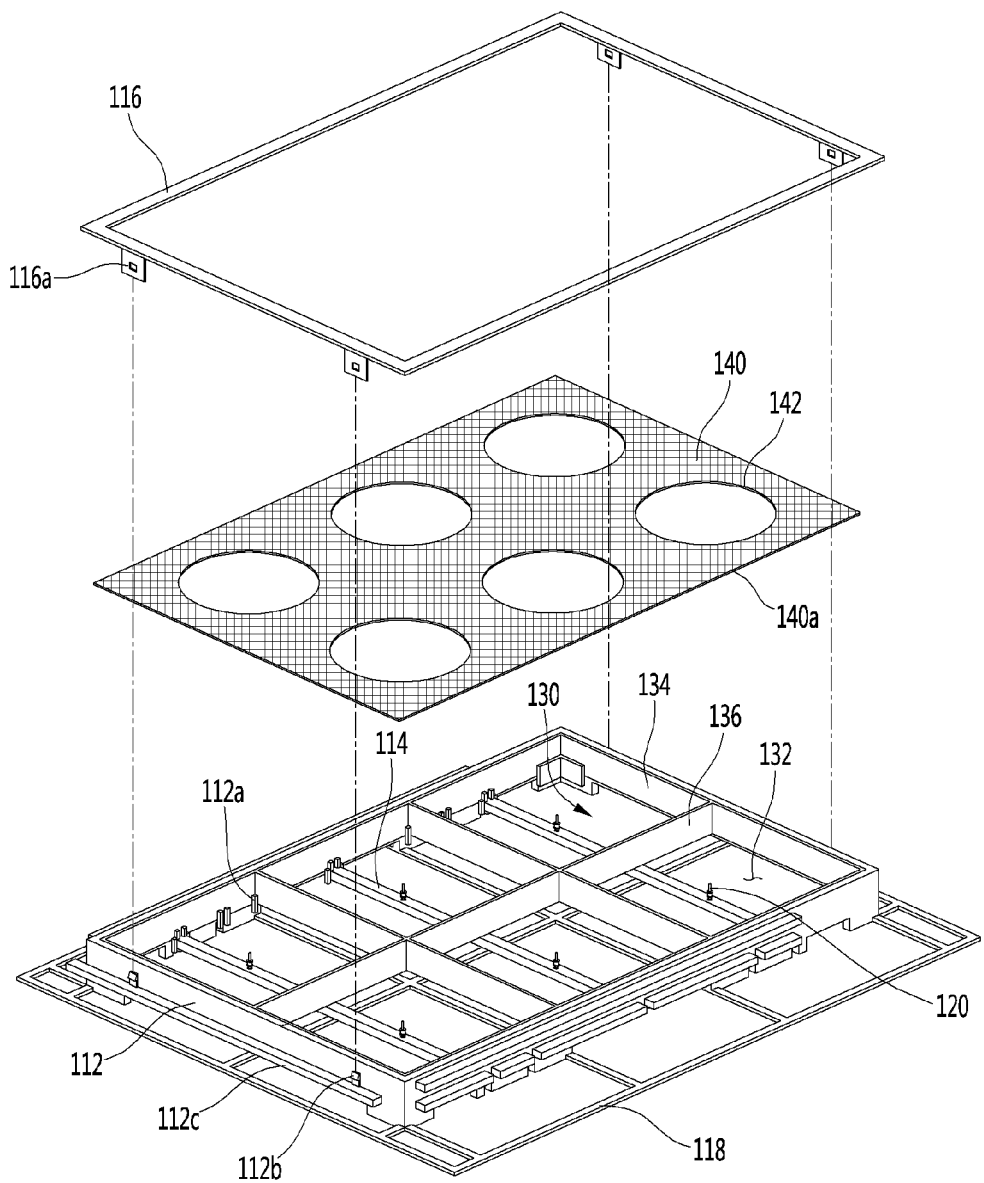
FIG. 7 is an exploded view illustrating the electrification apparatus for electric dust collection according to the second embodiment of the present invention.

FIG. 6 is a view illustrating an electrification apparatus for electric dust collection according to a second embodiment of the present invention, and FIG. 7 is an exploded view illustrating the electrification apparatus for electric dust collection according to the second embodiment of the present invention.

As illustrated in FIGS. 6 and 7, the electrification apparatus 100 further includes a mesh cover 140. The mesh cover 140 is provided in a net shape having a plurality of openings so that air can flow. At this time, the mesh cover 140 functions to filter relatively large foreign matters flowing into the electrification apparatus 100.

The mesh cover 140 may be seated on the upper end of the conductive plate 130. Accordingly, the mesh cover 140 may be formed in a rectangular shape corresponding to the conductive plate 130.

Specifically, the mesh cover 140 is provided with a mesh cover end 140a for forming an outside. The mesh cover end 140a corresponds to a portion of the mesh cover 140. The mesh cover end 140a is seated on the upper end of the outer plate 134.

The cover frame 116 is seated on the upper surface of the mesh cover end 140a and is coupled with the main body frame 112. In other words, the mesh cover end 140a may be disposed between the outer plate 134 and the cover frame 116 and fixed thereto. Accordingly, the mesh cover 140 can be seated on the upper end of the conductive plate 130.

In addition, the mesh cover 140 may be formed of the same conductive material as the metal. Specifically, the mesh cover 140 may be formed of a metal wire mesh, which is air-permeable and has conductivity. Accordingly, the ground electrode may be applied to the mesh cover 140, as in the conductive plate 134.

In addition, a plurality of through-holes 142 may be formed on the mesh cover 140. At this time, the through-hole 142 corresponds to an opening much larger than a plurality of openings formed in the mesh cover 140.

In addition, the through-hole 142 may be formed in a shape different from that of the plurality of openings formed in the mesh cover 140 and be distinguished. For example, the plurality of openings formed in the mesh cover 140 are formed in a square shape, and the through-holes 142 are formed in a circular shape.

The through-hole 142 is formed in a circular shape around the conductive microfibers 120. In other words, the conductive microfibers 120 are disposed at the center of the through-hole 142. The size of the through-hole 142 may be formed so as not to overlap with the adjacent through-hole 142.

In addition, the through-holes 142 are formed in a number corresponding to the conductive microfibers 120. For example, as illustrated in FIGS. 6 and 7, six through-holes 142 are formed in the mesh cover 140, corresponding to six conductive microfibers 120.

The conductive plate 130 is disposed to surround the conductive microfibers 120 in a rectangular shape. Therefore, the interval between the conductive microfibers 120 and the conductive plate 130 may be different according to the direction.

Specifically, the conductive plate 130 forms a square electrification space 132 whose each side is A. Accordingly, the conductive microfibers 120 and the conductive plate 130 can be arranged at a minimum distance $A/2$ and a maximum distance $\sqrt{2}*A/2$. It is generally known that the electrification efficiency is higher in a case where a potential difference is formed at the same distance.

At this time, the mesh cover 140 functions to form a potential difference with the same distance based on the conductive microfibers 120. As described above, the mesh cover 140 is in contact with the conductive plate 130 to apply a ground electrode.

Therefore, a potential difference is formed between the through-hole 142 and the conductive microfibers 120. At this time, the through-holes 142 are formed at the same distance around the conductive microfibers 120. Therefore, a potential difference can be formed at the same distance based on the conductive microfibers 120.

Figure 8:
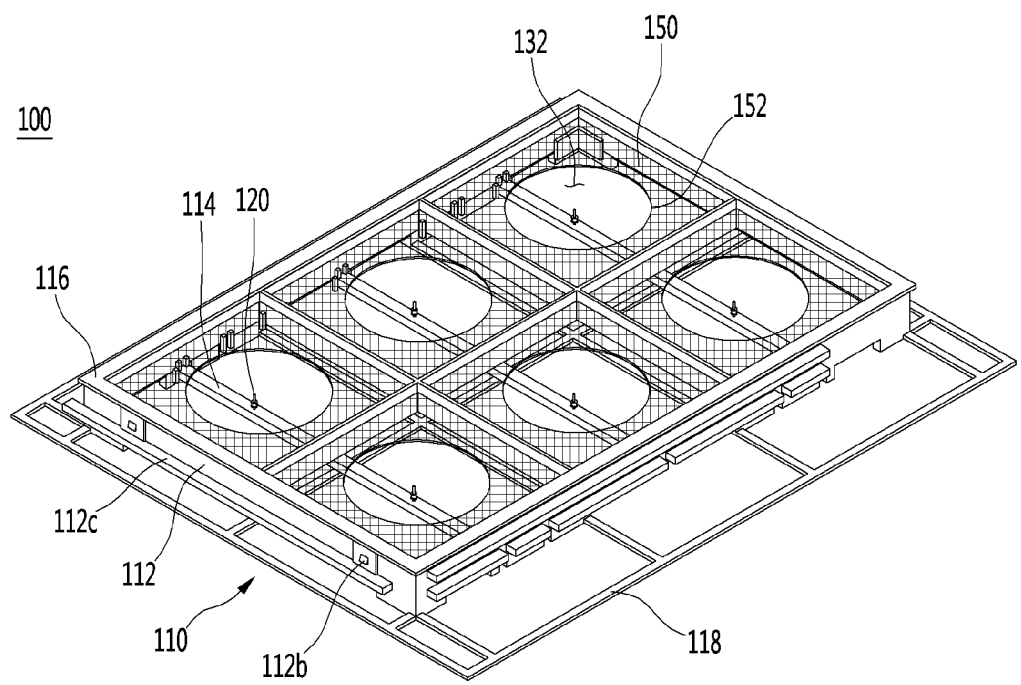
FIG. 8 is a view illustrating an electrification apparatus for electric dust collection according to a third embodiment of the present invention.
Figure 9:
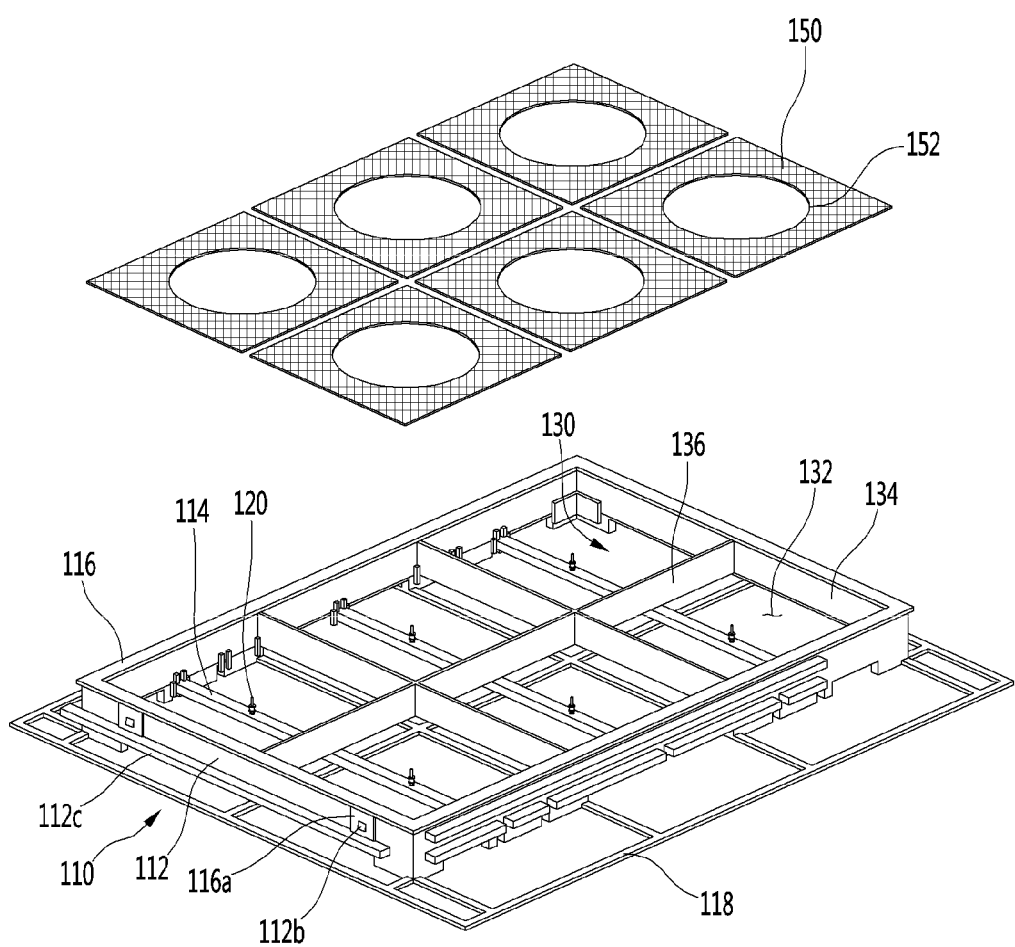
FIG. 9 is an exploded view illustrating the electrification apparatus for electric dust collection according to the third embodiment of the present invention.

FIG. 8 is a view illustrating an electrification apparatus for electric dust collection according to a third embodiment of the present invention, and FIG. 9 is an exploded view illustrating the electrification apparatus for electric dust collection according to the third embodiment of the present invention.

As illustrated in FIGS. 8 and 9, the electrification apparatus 100 further includes a mesh sheet 150. The mesh sheet 150 is provided in a net shape having a plurality of openings so that air can flow. At this time, the mesh sheet 150 functions to filter relatively large foreign matters flowing into the electrification apparatus 100.

The mesh sheet 150 may be installed in the electrification space 132. Accordingly, the mesh sheet 150 may be provided in a rectangular shape corresponding to the electrification space 132. For example, the mesh sheet 150 may be formed as a square whose one side is A.

The mesh sheet 150 may be attached to the conductive plate 134 with a predetermined bonding material. Specifically, the mesh sheet 150 is attached to the inner surface of the conductive plate 134, which forms one electrification space 132.

In addition, the mesh sheet 150 may be formed of a material having the same conductivity as that of the metal. Specifically, the mesh sheet 150 may be formed of a metal wire mesh through which air can flow and which has conductivity. Accordingly, a ground electrode may be applied to the mesh sheet 150, as in the conductive plate 134.

In addition, the mesh sheet 150 may have a through-hole 152 formed therein. At this time, the through-hole 152 corresponds to an opening much larger than a plurality of openings formed in the mesh sheet 150.

In addition, the through-holes 152 may be formed in a shape different from a plurality of openings formed in the mesh sheet 150 and be distinguished. For example, the plurality or openings formed in the mesh sheet 150 are formed in a square shape, and the through-holes 152 are formed in a circular shape.

The through-hole 152 is formed in a circular shape at the center of the mesh sheet 150. Accordingly, the conductive microfibers 120 are disposed at the center of the through-hole 152.

In addition, the mesh sheet 150 is disposed in the electrification space 132, respectively. In other words, the mesh sheet 150 is provided in a number corresponding to the conductive microfibers 120. For example, as illustrated in FIGS. 7 and 8, corresponding to six conductive microfibers 120, six mesh sheets 150 are provided.

The mesh sheet 150 functions to form a potential difference at the same distance based on the conductive microfibers 120. As described above, the mesh sheet 150 is in contact with the conductive plate 130 to apply a ground electrode.

Therefore, a potential difference is formed between the through-hole 152 and the conductive microfibers 120. At this time, the through-holes 152 are formed at the same distance around the conductive microfibers 120. Therefore, a potential difference can be formed at the same distance based on the conductive microfibers 120.

It can be understood that the mesh cover of the electrification apparatus according to the second embodiment and the mesh sheet of the electrification apparatus according to the third embodiment have the same function. The mesh cover and the mesh sheet may be referred to as mesh nets. However, it may be understood that it is separated or formed integrally for the sake of manufacturing and that the position of installation is changed.

Figure 10:
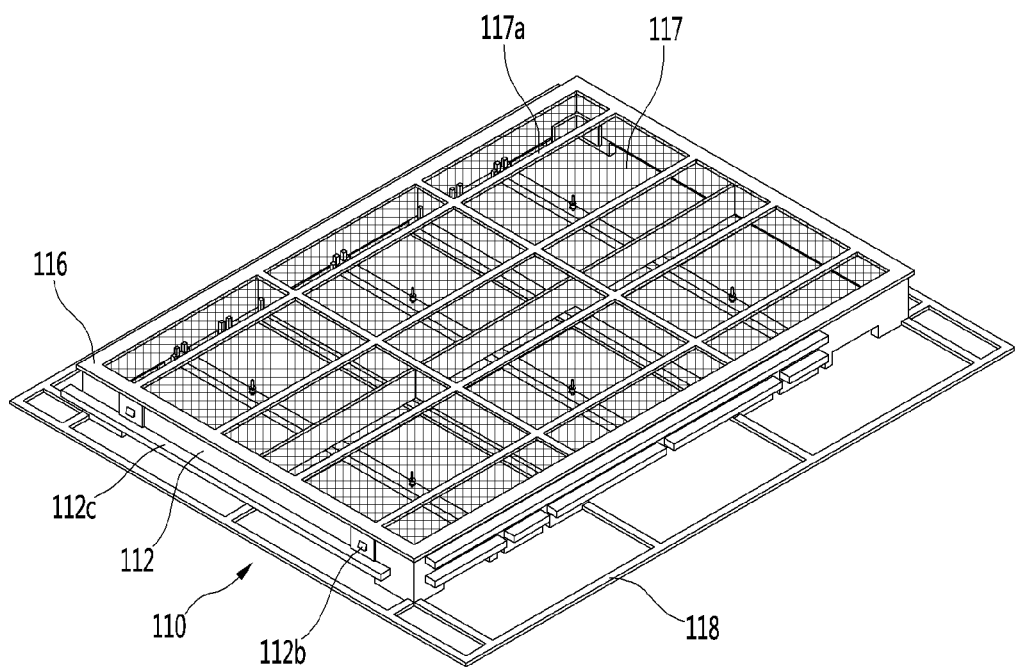
FIG. 10 is a view illustrating an electrification apparatus for electric dust collection according to a fourth embodiment of the present invention.
Figure 11:
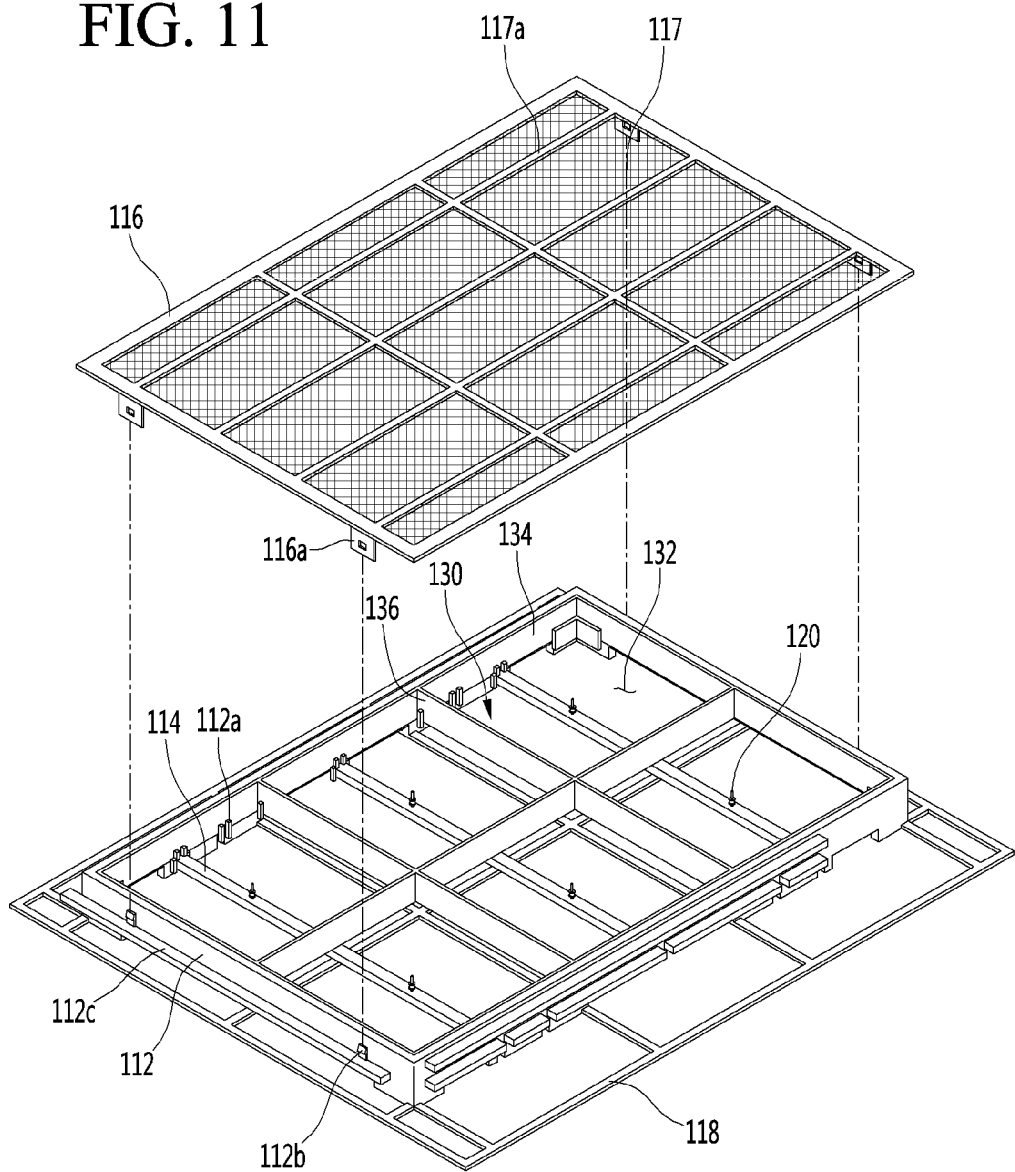
FIG. 11 is an exploded view illustrating the electrification apparatus for electric dust collection according to the fourth embodiment of the present invention.

FIG. 10 is a view illustrating an electrification apparatus for electric dust collection according to a fourth embodiment of the present invention, and FIG. 11 is an exploded view illustrating the electrification apparatus for electric dust collection according to the fourth embodiment of the present invention.

As illustrated in FIGS. 10 and 11, a mesh net 117 is installed on the cover frame 116. The mesh network 117 is provided in a shape having a plurality of openings so that air can flow. At this time, the cover frame 117 functions to filter relatively large foreign matters flowing into the electrification apparatus 100.

In addition, the cover frame 116 may further include a mesh net support portion 117a for supporting the mesh net 117. The shape, the number, and the like of the mesh net support portion 117a may be variously provided and may be omitted.

As described above, the cover frame 116 functions to be coupled with the main body frame 112 and fix the conductive plate 130. The mesh frame 117 is provided on the cover frame 116 so that the cover frame 116 can function as a top cover of the electrification apparatus 100.

In other words, the cover frame 116 forms the upper end of the electrification apparatus 100 to prevent foreign matter from entering or damage or the like of the electrification apparatus 100 due to foreign matters can be prevented.

As described above, the electrification apparatus 100 may further include various configurations or be modified into various shapes. The above description is exemplary and the electrification apparatus 100 may be formed in more various embodiments.

DESCRIPTION OF REFERENCE NUMERALS

1: air conditioner for vehicle
10: electric dust collection assembly
100: electrification apparatus (for electric dust collection)
110: Frame
120: conductive microfiber
130: conductive plate
132: electrification space
134: outer plate
136: inner plate
200: collector (for electric dust collection)

What is claimed is:

1. An electrification apparatus for electric dust collection in air, comprising:
a frame;
a conductive microfiber disposed in the frame and configured to generate ions in the air; and
conductive plates disposed in the frame and configured to generate a potential difference with the conductive microfiber,
wherein the conductive plates comprise a first conductive plate and a second conductive plate that are perpendicular to each other and that define an electrification space in which an electric field is generated, and
wherein the electrification space has a rectangular columnar shape and surrounds the conductive microfiber.

2. The electrification apparatus according to claim 1, wherein the conductive microfiber extends in a Z-axis direction and is installed on the frame, and
wherein the electrification space has a rectangular shape in an X-Y plane and extends in the Z-axis direction.

3. The electrification apparatus according to claim 2, wherein the conductive microfiber is positioned at a center of the electrification space in the X-Y plane.

4. The electrification apparatus according to claim 2, wherein the electrification space is closed in X and Y directions by the conductive plates and open in the Z-axis direction.

5. The electrification apparatus according to claim 1, wherein the conductive microfiber is positioned at a center of the electrification space, and
wherein a separation distance between the conductive microfiber and the first conductive plate is different from a separation distance between the conductive microfiber and the second conductive plate.

6. The electrification apparatus according to claim 1, further comprising:
an electric wire connected to the conductive microfiber and configured to supply a high voltage to the conductive microfiber; and
a ground electric wire connected to the conductive plates and configured to provide a ground electrode to the conductive plates.

7. The electrification apparatus according to claim 1, wherein the conductive microfiber includes a carbon brush comprising a bundle of carbon fibers.

8. The electrification apparatus according to claim 1, wherein the frame includes:
   a main body frame that supports the conductive plates; and
   an installation frame on which the conductive microfiber is installed, and
   wherein both ends of the installation frame are fixed to the main body frame.

9. The electrification apparatus according to claim 1, wherein the first conductive plate is an outer plate having a rectangular shape, and
   wherein the second conductive plate is one of inner plates that divide a space defined in the outer plate into a plurality of electrification spaces, the inner plates being perpendicular to the outer plate.

10. The electrification apparatus according to claim 9, wherein the conductive microfiber is one of a plurality of conductive microfibers, and
    wherein each of the plurality of conductive microfibers is disposed at a center of one of the plurality of electrification spaces.

11. The electrification apparatus according to claim 9, wherein both ends of the inner plates are connected to the outer plate.

12. The electrification apparatus according to claim 9, wherein the frame includes:
    a main body frame to which the outer plate is coupled;
    a cover frame that is coupled to the main body frame and that fixes the outer plate to the main body frame; and
    an installation frame that supports the conductive microfiber and that extends to a side of the main body frame.

13. An electrification apparatus for electric dust collection in air, comprising:
    a frame;
    a conductive microfiber disposed in the frame and configured to generate ions in the air; and
    conductive plates disposed in the frame and configured to generate a potential difference with the conductive microfiber,
    a mesh net connected to the conductive plate, the mesh net having a through-hole that has a circular shape around the conductive microfiber,
    wherein the conductive plates surround the conductive microfiber and define an electrification space in which an electric field is generated, and
    wherein the electrification space has a rectangular columnar space.

14. The electrification apparatus according to claim 13, wherein the mesh net has a plurality of openings through which air flows, the mesh net having a rectangular shape corresponding to the electrification space.

15. The electrification apparatus according to claim 1, wherein the rectangular columnar shape comprises a square columnar shape.

16. The electrification apparatus according to claim 1, wherein the first and second conductive plates are accommodated inside the frame such that outer surfaces of the first and second conductive plates face an inside surface of the frame.

17. The electrification apparatus according to claim 1, wherein the conductive microfiber extends in a Z-axis direction, and
    wherein a height of the first and second conductive plates in the Z-axis direction is greater than a thickness of the first and second conductive plates in an X-axis direction or a Y-axis direction, wherein the X-axis direction, the Y-axis direction, and the Z-axis direction are perpendicular to one another.

18. The electrification apparatus according to claim 1, wherein the first and second conductive plates are integrally formed with each other.

19. The electrification apparatus according to claim 1, wherein the first and second conductive plates are coupled to each other.

* * * * *